(12) United States Patent
Takahashi

(10) Patent No.: US 8,667,926 B2
(45) Date of Patent: Mar. 11, 2014

(54) PAINTING ROBOT AND PAINTING SYSTEM

(75) Inventor: Shingi Takahashi, Kitakyushu (JP)

(73) Assignee: Kabushiki Kaisha Yaskawa Denki, Kitayushu-Shi, Fukuoka (JP)

( * ) Notice: Subject to any disclaimer, the term of this patent is extended or adjusted under 35 U.S.C. 154(b) by 67 days.

(21) Appl. No.: 13/289,192

(22) Filed: Nov. 4, 2011

(65) Prior Publication Data
US 2012/0145075 A1 Jun. 14, 2012

(30) Foreign Application Priority Data
Dec. 9, 2010 (JP) ................................ 2010-274744

(51) Int. Cl.
*B05B 3/00* (2006.01)
*B05B 13/04* (2006.01)
*B05B 15/12* (2006.01)

(52) U.S. Cl.
USPC .............. 118/323; 118/321; 118/326; 901/43

(58) Field of Classification Search
USPC ........... 118/323, 321, 300, 326, 50, 634, 309, 118/DIG. 7; 427/427.2, 427.3; 901/27, 29, 901/41, 43; 74/490.04
See application file for complete search history.

(56) References Cited

U.S. PATENT DOCUMENTS

| 7,384,662 B2 * | 6/2008 | Takano et al. .................. 427/64 |
| 7,429,298 B2 | 9/2008 | Krogedal et al. |
| 7,622,001 B2 | 11/2009 | Inada et al. |
| 2011/0166708 A1 | 7/2011 | Herre et al. |

FOREIGN PATENT DOCUMENTS

| DE | 36 30 731 | 3/1987 |
| DE | 10 2008 045 553 | 3/2010 |
| EP | 2 184 140 | 5/2010 |
| JP | 2005-040791 | 2/2005 |
| JP | 2005028270 A * | 2/2005 |
| JP | 2007-021612 | 2/2007 |
| JP | 4520268 | 5/2010 |

OTHER PUBLICATIONS

Japanese Office Action dated Jan. 29, 2013 and the English translation thereof.
The extended European search report dated Mar. 27, 2012.

* cited by examiner

*Primary Examiner* — Yewebdar Tadesse
(74) *Attorney, Agent, or Firm* — Bacon & Thomas, PLLC

(57) ABSTRACT

A painting robot includes a fixing unit fixed to a sidewall of a painting booth; a swivel unit provided to swivel with respect to the fixing unit; an arm provided to the swivel unit; and a painting gun provided in a tip end portion of the arm. The fixing unit includes a fixing surface fixed to the sidewall of the painting booth; and a cable lead-in portion provided on the fixing surface to lead a cable into the painting robot therethrough.

16 Claims, 6 Drawing Sheets

PAINTING ROBOT AND PAINTING SYSTEM

FIELD OF THE INVENTION

The present invention relates to a painting robot and a painting system.

BACKGROUND OF THE INVENTION

Conventionally, a painting robot is provided on a sidewall of a painting booth. A cable connected to the painting robot passes through the sidewall of the painting booth at the upper side of the painting robot and extends to the outside of the painting booth (see, e.g., Japanese Patent No. 4520268, Page 5 and FIG. 2). For this reason, the painting booth needs to have a ceiling height at least great enough to arrange the cable.

It is required under the explosion-proof standards that, as shown in FIG. 7, a cable 209 connected to a painting robot 201 within a painting booth be protected from mechanical damage by a cable protection member, e.g., a wire braid 202. Referring to FIG. 7, a connector 208 is connected to a tip end of a bell mouth 206 provided in a fixing unit 204 of the painting robot 201. The wire braid 202 is screwed into the connector 208 and connected to the bell mouth 206. The cable 209 is arranged to extend through the wire braid 202.

In order to install the painting robot 201 within the painting booth, it is necessary to perform not only a work of installing the body of the painting robot 201 on a sidewall 210 of the painting booth but also a first work of inserting the cable 209 through a through-hole 212 formed in the sidewall 210 of the painting booth and sealing with a sealant 214 the gap generated between the cable 209 and the sidewall 210 and a second work of covering with a cable protection member the cable 209 arranged within the painting booth.

SUMMARY OF THE INVENTION

In accordance with a first aspect of the present invention, there is provided a painting robot including a fixing unit fixed to a sidewall of a painting booth; a swivel unit provided to swivel with respect to the fixing unit; an arm provided to the swivel unit; and a painting gun provided in a tip end portion of the arm. The fixing unit includes a fixing surface fixed to the sidewall of the painting booth; and a cable lead-in portion provided on the fixing surface to lead a cable into the painting robot therethrough.

In accordance with a second aspect of the present invention, there is provided a painting system including a painting booth including a sidewall with a through hole; a painting robot for painting a workpiece conveyed into the painting booth; and a robot control unit, installed outside the painting booth, for controlling an operation of the painting robot. The painting robot includes a fixing unit fixed to the sidewall to close the through hole and provided with a cable lead-in portion arranged at a position corresponding to the through hole to lead a cable into the painting robot; a swivel unit provided to swivel with respect to the fixing unit; an arm provided in the swivel unit; and a painting gun provided in a tip end portion of the arm. The cable extends from the robot control unit and is led into the cable lead-in portion through the through-hole.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

For the sake of understanding of the present invention, certain embodiments of the present invention will now be described with reference to the accompanying drawings which form a part hereof. In the respective drawings, it is sometimes the case that those portions having nothing to do with the description are not illustrated.

Figure 1:
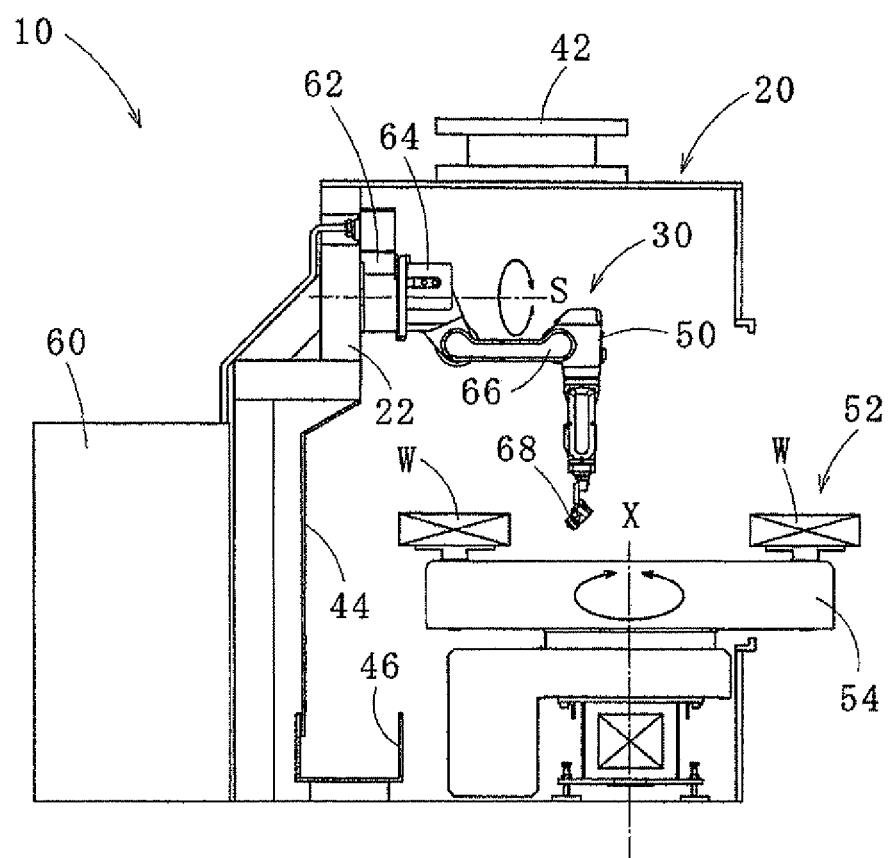
FIG. 1 is an explanatory view showing a painting system in accordance with a first embodiment of the present invention.

Referring to FIG. 1, a painting system 10 according to a first embodiment of the present invention includes a painting booth 20 and a painting robot system 30. The painting booth 20 includes an air conditioner 42, a water curtain unit 44 and a water tank 46. The air conditioner 42 can generate an air stream while managing air condition within the painting booth 20. The floating paint contained in the air stream within the painting booth 20 is collected by the water curtain unit 44 provided along a wall surface below a painting robot 50 and by the water tank 46 provided below the water curtain unit 44.

A workpiece supply device 52 is provided within the painting booth 20. The workpiece supply device 52 includes a swivel table 54 swiveling about an axis X intersecting a floor surface and can supply a workpiece W to be painted. The workpiece W is set to one end of the swivel table 54 from the outside of the painting booth 20. As the swivel table 54 is swiveled, the workpiece W moves into a working area of the painting robot 50.

Figure 2:
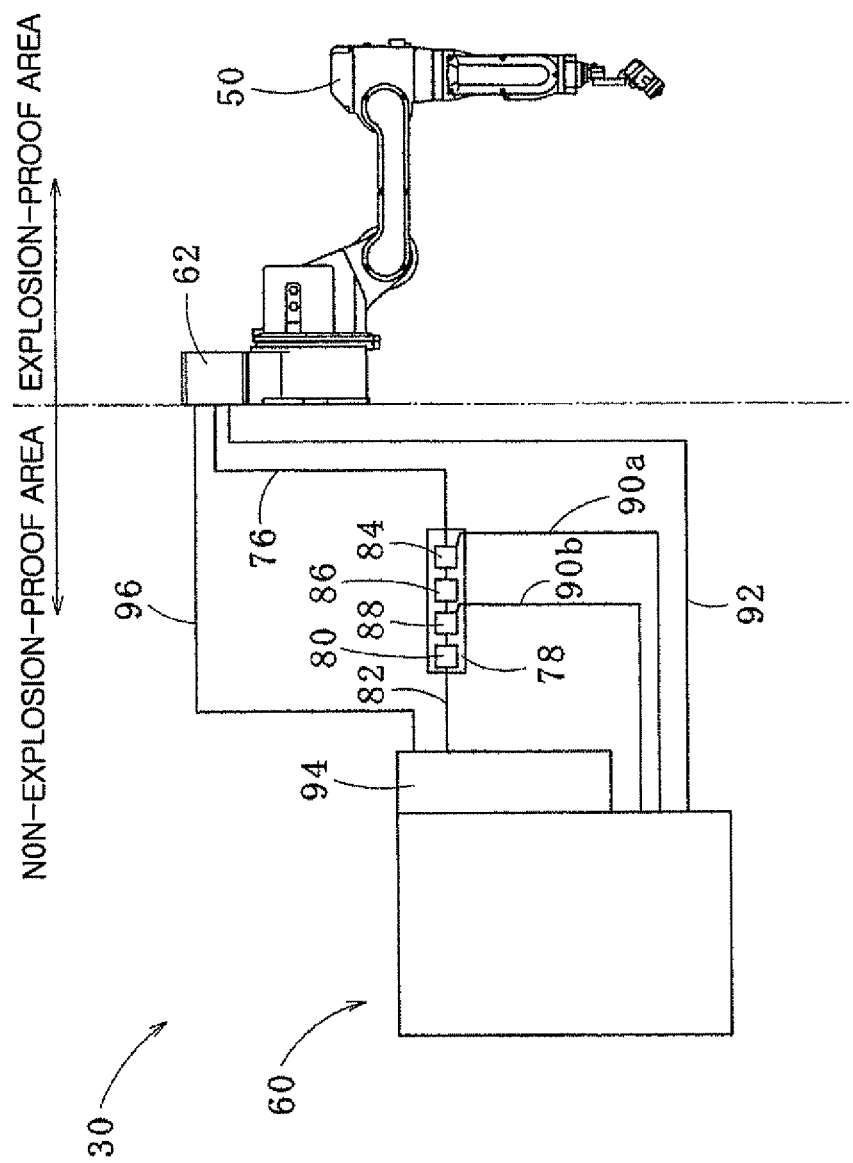
FIG. 2 is a configuration view showing a painting robot employed in the painting system.

Referring to FIGS. 1 and 2, the painting robot system 30 includes a painting robot 50 and a robot control unit 60.

As shown in FIG. 1, the painting robot 50 includes a fixing unit 62 fixed to a sidewall 22 of the painting booth 20, a swivel unit 64 provided in the fixing unit 62 and configured to swivel about a swivel axis S intersecting the wall surface of the painting booth 20, an arm 66 provided to the swivel unit 64, and a painting gun 68 provided in a tip end portion of the arm 66. The painting robot 50 can paint the workpiece W conveyed into the working area by the workpiece supply device 52.

Figure 3:
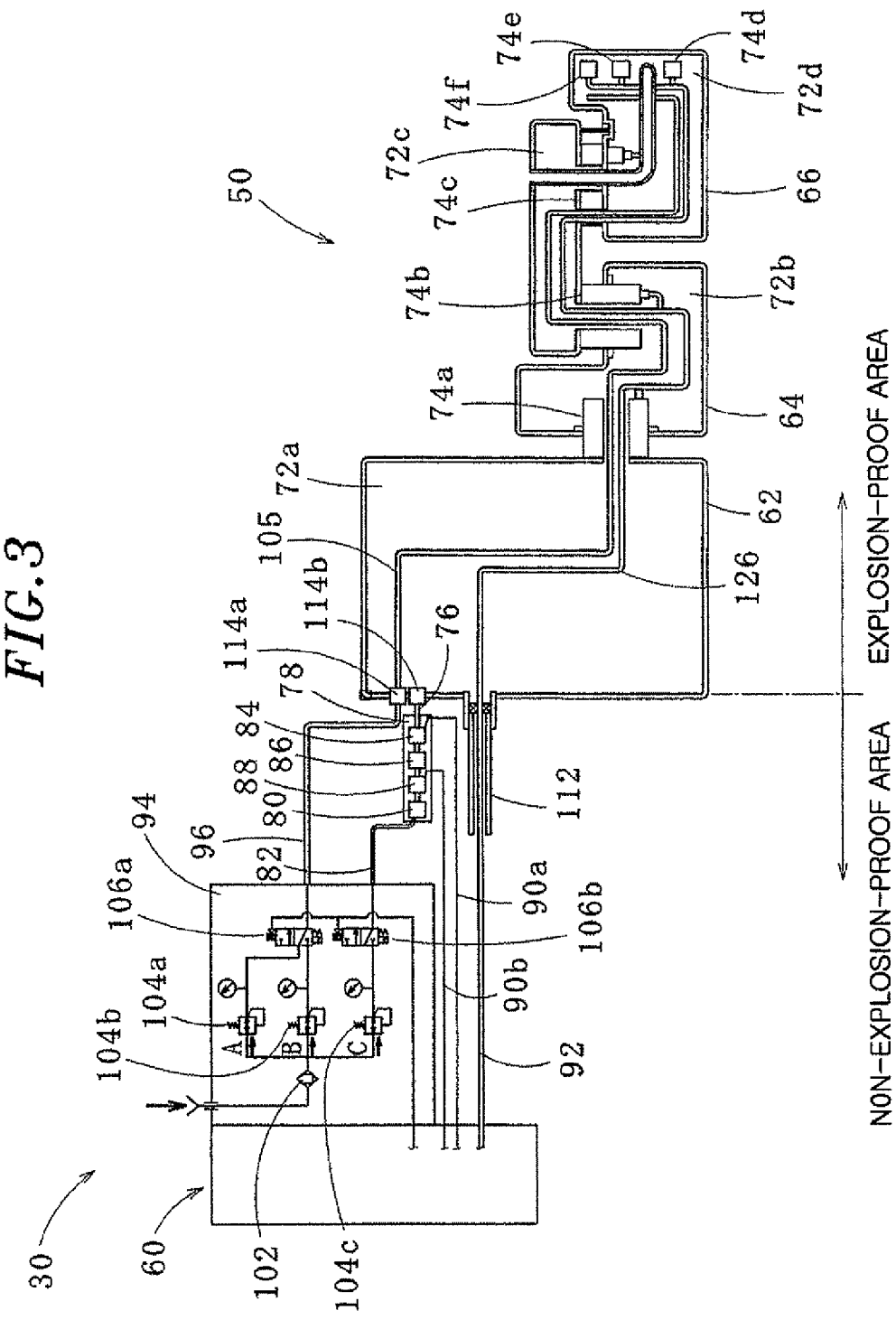
FIG. 3 shows a painting robot system employed in the painting system.

The painting robot 50 is installed on the sidewall 22 of the painting booth 20, e.g., in a wall-mount manner. As shown in FIG. 3, a plurality, of substantially sealed airtight chambers 72a through 72d are formed inside the painting robot 50. Motors 74a through 74f for driving individual joints of the painting robot 50 are provided at the respective airtight chambers 72a through 72d.

As shown in FIGS. 2 and 3, the airtight chambers 72a through 72d communicate with a gas exhaust unit 78 (not shown in FIG. 1) through an exhaust pipe 76. The gas exhaust unit 78 includes a shutoff valve 80 to which the exhaust pipe 76 is connected. A gas (protective gas) existing within the airtight chambers 72a through 72d can be discharged to the outside by opening the shutoff valve 80 and can be kept within the airtight chambers 72a through 72d by closing the shutoff valve 80. The shutoff valve 80 is pneumatically driven and is opened when supplied with an air from a control pipe 82.

As shown in FIG. 3, the gas exhaust unit 78 further includes: a flow switch 84 for outputting a signal if the gas flows through the exhaust pipe 76 at a flow rate falling within a predetermined range; a pressure regulating valve 86 for, when a pressure within the exhaust pipe 76 (or the airtight chambers 72a through 72d) grows higher than a preset pressure, discharging the gas from the exhaust pipe 76 to reduce the internal pressure of the airtight chambers 72a through 72d; and a pressure detector 88 for outputting a signal if the pressure within the exhaust pipe 76 (or the airtight chambers 72a through 72d) becomes lower than the preset pressure.

The flow switch 84, the pressure regulating valve 86 and the pressure detector 88 are arranged in that order from the painting robot 50. The flow switch 84 and the pressure detector 88 are connected to the robot control unit 60 installed outside the painting booth 20, via signal lines 90a and 90b through which the signals outputted from the flow switch 84 and the pressure detector 88 are transmitted, respectively. The gas exhaust unit 78 is installed on an outer wall surface of the painting booth 20.

The robot control unit 60 can control the operation of the painting robot 50. The robot control unit 60 and the painting robot 50 are connected to each other by a cable 92 for driving the respective motors 74a through 74f (the cable 92 including a power supply cable 92a for supplying a drive current to the motors 74a through 74f and a signal cable 92b connected to encoders of the motors 74a through 74f) (see FIGS. 3 and 4).

A gas supply unit 94 for supplying a protective gas is provided in the robot control unit 60. The gas supply unit 94 can supply the protective gas to the airtight chambers 72a through 72d of the painting robot 50 through a gas supply line 96. The gas supply unit 94 can also supply the gas to the shutoff valve 80 of the gas exhaust unit 78 through a control pipe 82, thereby controlling the shutoff valve 80. Specifically, as shown in FIG. 3, a compressed air as a protective gas is introduced into the gas supply unit 94 from a pressure gas source (not shown) provided outside. After passing through a filter 102, the protective gas is divided into protective gases "A," "B" and "C" flowing through three routes. The protective gases "A," "B" and "C" are sent to a first pressure regulator 104a, a second pressure regulator 104b and a third pressure regulator 104c, respectively.

The pressure of the protective gas "A" is regulated by the first pressure regulator 104a to a pressure slightly higher than the atmospheric pressure around the painting robot 50. The pressure of the protective gas "B" is regulated by the second pressure regulator 104b to a pressure higher than the pressure of the protective gas "A" regulated by the first pressure regulator 104a. The pressure-regulated protective gases "A" and "B" flow through a first electromagnetic valve 106a and are sent to the airtight chambers 72a through 72d through the gas supply, pipe 96 and a internal gas supply pipe 105 provided within the painting robot 50.

In the meantime, the pressure of the protective gas "C" is regulated by the third pressure regulator 104c to a pressure high enough to operate the shutoff valve 80. The pressure-regulated protective gas "C" flows through a second electromagnetic valve 106b and is supplied, as the drive power of the shutoff valve 80, to the shutoff valve 80 of the gas exhaust unit 78 through the control pipe 82.

Figure 4:
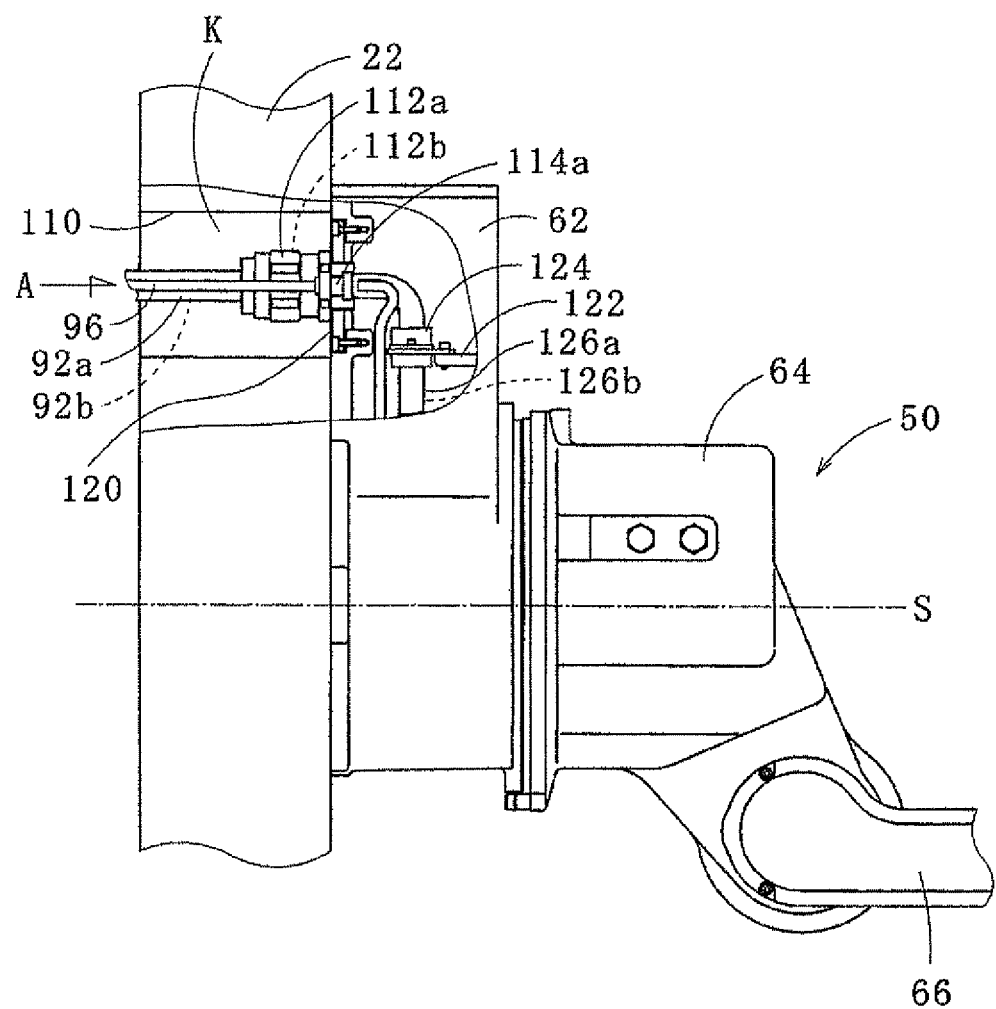
FIG. 4 is an enlarged view illustrating a fixing unit of the painting robot employed in the painting system.
Figure 5:
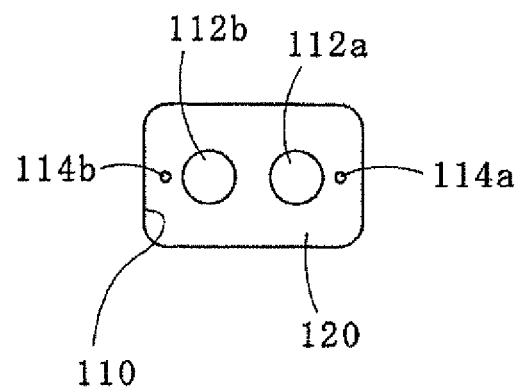
FIG. 5 is a view as seen in the direction indicated by an arrow "A" in FIG. 4.

Next, the fixing unit 62 of the painting robot 50 will be described in detail. As shown in FIG. 4, the fixing unit 62 of the painting robot 50 is fixed to the sidewall 22 of the painting booth 20 so as to close a through hole 110 formed in the sidewall 22. On the fixing surface 120 of the fixing unit 62 fixed to the sidewall 22 of the painting booth 20, first and second cable lead-in portions 112a and 112b (hereinafter sometimes collectively referred to as "cable lead-in portion 112") and first and second pipe connection portions 114a and 114b are provided at a position corresponding to the through hole 110 of the sidewall 22 (see FIG. 5).

Specifically, the first and second cable lead-in portions 112a and 112b and the first and second pipe connection portions 114a and 114b are provided in the upper area of the fixing unit 62 (above the swivel axis "S" when the painting robot 50 is seen in a side view) so as not to hinder the painting operation of the painting robot 50. The power supply cable 92a and the signal cable 92b are respectively led into the first and second cable lead-in portions 112a and 112b through the through-hole 110 formed in the sidewall 22 of the painting booth 20. The gas supply pipe 96 and the exhaust pipe 76 are respectively connected to the first and second pipe connection portions 114a and 114b through the through-hole 110 formed in the sidewall 22 of the painting booth 20.

In other words, the power cable 92a of the cable 92 extending from the robot control unit 60 is led into the first cable lead-in portion 112a. The signal cable 92b of the cable 92 extending from the robot control unit 60 is led into the second cable lead-in portion 112b. The first and second cable lead-in portions 112a and 112b are formed of, e.g., bell mouths protruding from the fixing surface 120 of the fixing unit 62, and the internal pressure of the painting robot 50 is protected.

The gas supply pipe 96 leading to the gas supply unit 94 is connected to the first pipe connection portion 114a. The exhaust pipe 76 leading to the gas exhaust unit 78 is connected to the second pipe connection portion 114b. The first and second pipe connection portions 114a and 114b are formed of, e.g., union joints protruding from the fixing surface 120 of the fixing unit 62.

As shown in FIG. 4, the power cable 92a led into the painting robot 50 through the first cable lead-in portion 112a is connected within the fixing unit 62 to a first in-robot cable 126a extending to the motors 74a through 74f, by virtue of a connector 124 fixed in place by a bracket 122. The signal cable 92b led into the painting robot 50 through the second cable lead-in portion 112b is connected within the fixing unit 62 to a second in-robot cable 126b extending to the respective encoders (not shown), by virtue of a connector (not shown) fixed in place by a bracket (not shown). In FIG. 3, the first in-robot cable 126a and the second in-robot cable 126b are collectively illustrated as an in-robot cable 126.

The gap between the fixing surface 120 of the fixing unit 62 and the wall surface of the painting booth 20 is sealed, and the internal space K of the through-hole 110 is isolated from an explosion-proof area. An arbitrary sealing method may be used as far as the internal space K can be isolated from the explosion-proof area. Examples of the sealing method include a method of surrounding the periphery of the opening of the through-hole 110 with an O-ring and a method of applying a sealant to the gap between the fixing surface 120 of the fixing unit 62 and the wall surface of the painting booth 20.

With the present embodiment described above, the cable 92 led into the painting robot 50 does not extend above the fixing unit 62 of the painting robot 50 unlike the prior art. In proportion, it is possible to reduce the ceiling height of the painting booth 20 and the size of the painting booth 20.

Since the cable 92 is not exposed in the painting booth 20, it is possible to omit a work of covering the cable 92 with a cable protection member, which is required in the prior art.

In addition to the first and second cable lead-in portions 112a and 112b, the first and second pipe connection portions 114a and 114b are provided in the fixing surface 120 of the fixing unit 62 of the painting robot 50. This makes it possible to perform a wiring work and a piping work together.

Next, description will be made on a painting system in accordance with a second embodiment of the present invention. The same components as those of the painting system 10 of the first embodiment will be designated by like reference symbols and will not be described in detail.

Figure 6:
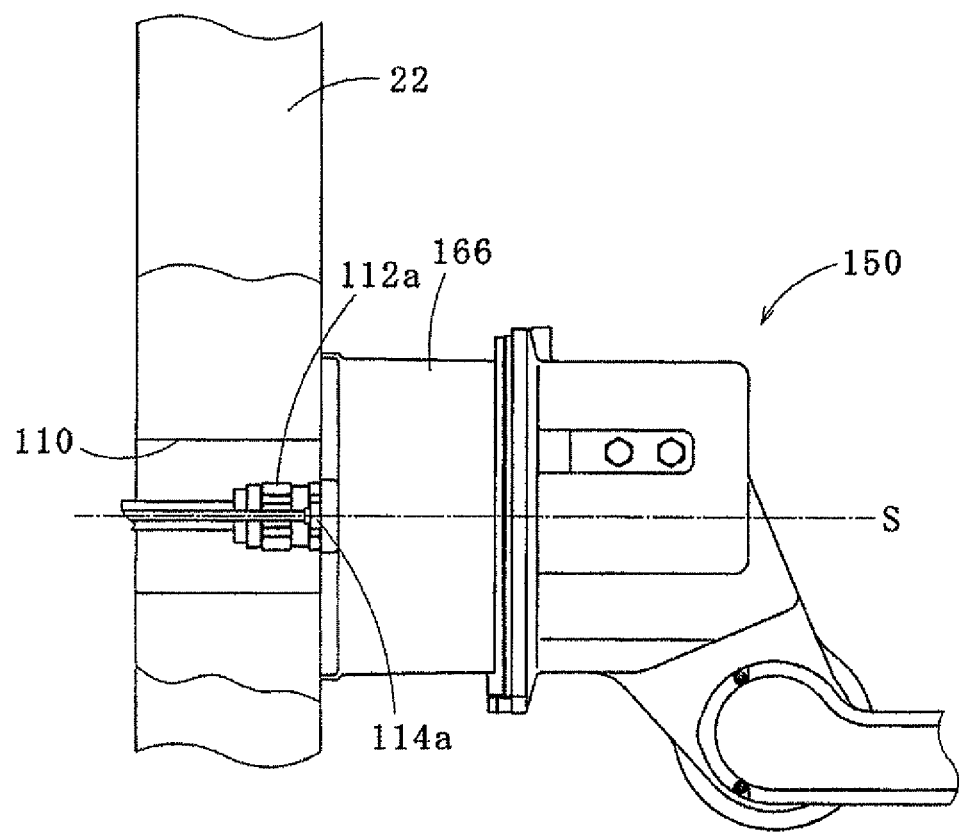
FIG. 6 is an enlarged view illustrating a fixing unit of a painting robot employed in a painting system in accordance with a second embodiment of the present invention.
Figure 7:
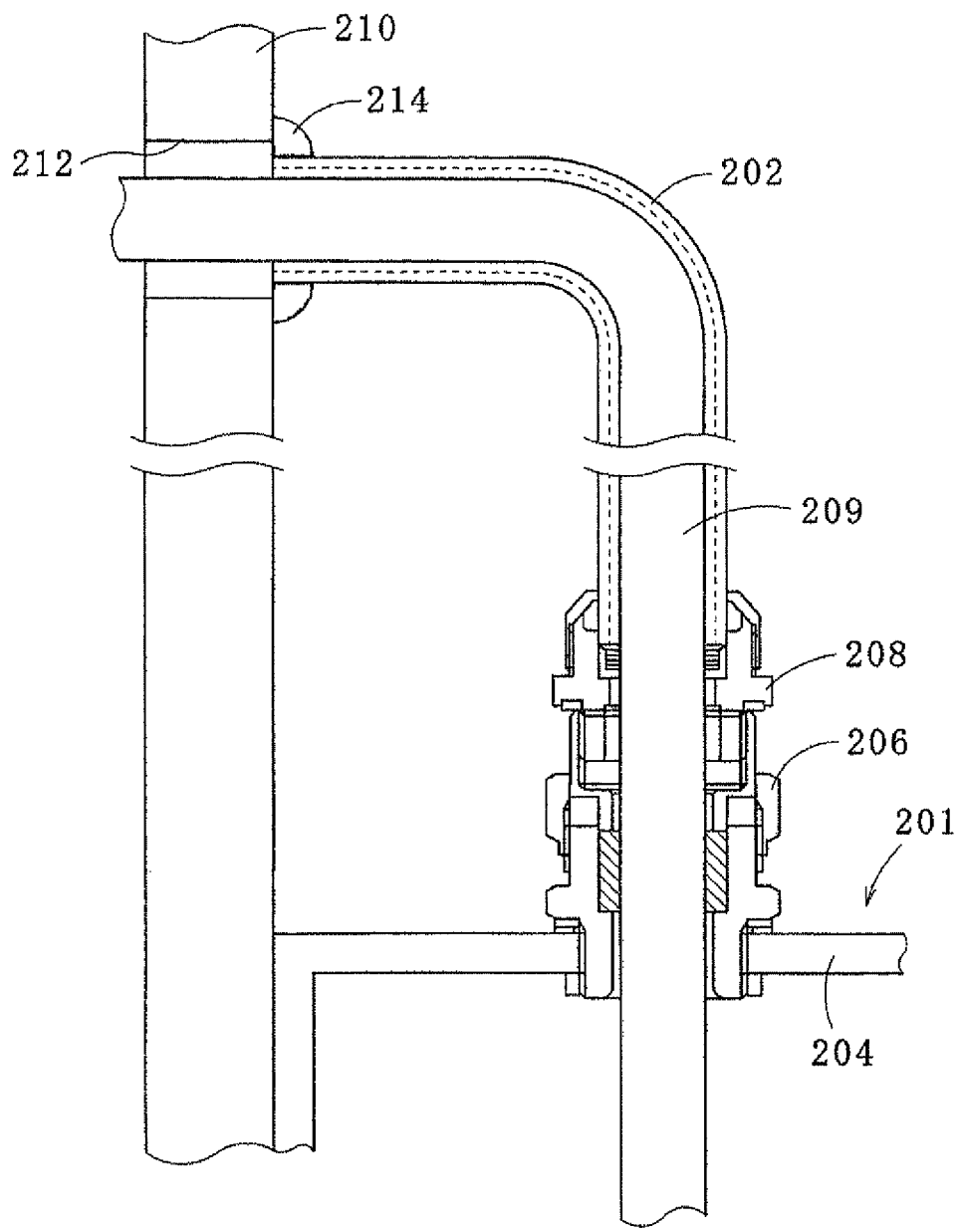
FIG. 7 is an explanatory view (section view) depicting a wire braid.

Referring to FIG. 6, the painting robot 150 employed in the painting system of the present embodiment is fixed to the sidewall 22 such that the swivel axis S extends through the through hole 110 of the painting booth 20. The first cable lead-in portion 112a, the second cable lead-in portion 112b, the first pipe connection portion 114a and the second pipe connection portion 114b are provided at a position of the fixing unit 166 corresponding to the through hole 110.

As compared with the painting robot 50 of the first embodiment, it is possible to reduce the upwardly protruding amount of the fixing unit 166 (see FIGS. 4 and 6). As a result, it is possible to further reduce the ceiling height of the painting booth 20 and the size of the painting booth 20.

The present invention is not limited to the foregoing embodiments but may be modified without departing from the scope and spirit of the invention. For example, the foregoing embodiments and the modifications thereof may be combined partly or in their entirety. These combinations shall be construed to fall within the scope of the present invention.

The first and second cable lead-in portions 112a and 112b may have any other arbitrary configuration as far as they can lead the cable into the painting robot. As another example of the cable lead-in portions, it may be possible to use a sealed through-hole formed in the fixing portion (the fixing surface) facing the through-hole of the sidewall of the painting booth and configured to communicate with the interior of the painting robot.

The first and second cable lead-in portions 112a and 112b may be replaced by first and second connectors to which the power cable 92a and the signal cable 92b are connected, respectively.

The first and second pipe connection portions 114a and 114b may be replaced by first and second pipe lead-in portions through which the gas supply pipe and the exhaust pipe are led into the painting robot, respectively.

While the invention has been shown and described with respect to the embodiments, it will be understood by those skilled in the art that various changes and modifications may be made without departing from the scope of the invention as defined in the following claims.

What is claimed is:

1. A painting robot, comprising:
a fixing unit fixed to a sidewall of a painting booth;
a swivel unit provided to swivel with respect to the fixing unit;
an arm provided to the swivel unit; and
a painting gun provided in a tip end portion of the arm,
wherein the fixing unit includes:
a fixing surface fixed to the sidewall of the painting booth; and
a cable lead-in portion provided on the fixing surface, and
wherein the cable lead-in portion is configured to protrude into the sidewall to lead a cable into the painting robot therethrough.

2. The robot of claim 1, wherein the cable lead-in portion is provided in an upper area of the fixing unit.

3. The robot of claim 1, wherein the cable lead-in portion is a bell mouth.

4. The robot of claim 2, wherein the cable lead-in portion is a bell mouth.

5. The robot of claim 2, wherein the cable lead-in portion is a connector to which the cable is connected.

6. The robot of claim 2, wherein the fixing unit further includes a first pipe connection portion on the fixing surface such that a gas supply pipe is connected to the first pipe connection portion, the gas supply pipe serving to supply therethrough a protective gas to an airtight chamber formed within the painting robot; and a second pipe connection portion provided on the fixing surface such that an exhaust pipe is connected to the second pipe connection portion, the exhaust pipe serving to exhaust therethrough the protective gas from the airtight chamber.

7. The robot of claim 6, wherein the swivel unit is configured to swivel about a swivel axis intersecting a surface of the side wall of the painting booth, and
wherein the cable lead-in portion and the first and the second pipe connection portion are provided above the swivel axis.

8. The robot of claim 6, wherein the first and the second pipe connection portion are formed of union joints.

9. The robot of claim 1, wherein the cable lead-in portion is a connector to which the cable is connected.

10. The robot of claim 1, wherein the fixing unit further includes a first pipe connection portion on the fixing surface such that a gas supply pipe is connected to the first pipe connection portion, the gas supply pipe serving to supply therethrough a protective gas to an airtight chamber formed within the painting robot; and a second pipe connection portion provided on the fixing surface such that an exhaust pipe is connected to the second pipe connection portion, the exhaust pipe serving to exhaust therethrough the protective gas from the airtight chamber.

11. The robot of claim 10, wherein the swivel unit is configured to swivel about a swivel axis intersecting a surface of the side wall of the painting booth, and
wherein the cable lead-in portion and the first and the second pipe connection portion are provided above the swivel axis.

12. The robot of claim 10, wherein the first and the second pipe connection portion are formed of union joints.

13. A painting system, comprising:
the painting robot of claim 1.

14. The painting system of claim 13, further comprising:
a painting booth including the sidewall with a through-hole; and
a robot control unit, installed outside the painting booth, for controlling an operation of the painting robot,
wherein the painting robot is configured to paint a workpiece conveyed into the painting booth,
wherein the fixing unit of the paining robot closes the through-hole and is provided with a cable lead-in portion arranged at a position correspond to the through-hole to lead the cable into the painting robot, and
wherein the cable extends from the robot control unit and is led into the cable lead-in portion through the through-hole.

15. The robot of claim 1, wherein the sidewall has a through-hole through which the cable extends and the fixing unit is configured to close the through-hole.

16. The robot of claim 1, wherein the swivel unit is configured to swivel about a swivel axis intersecting a surface of the side wall of the painting booth.

* * * * *